Patented July 29, 1941

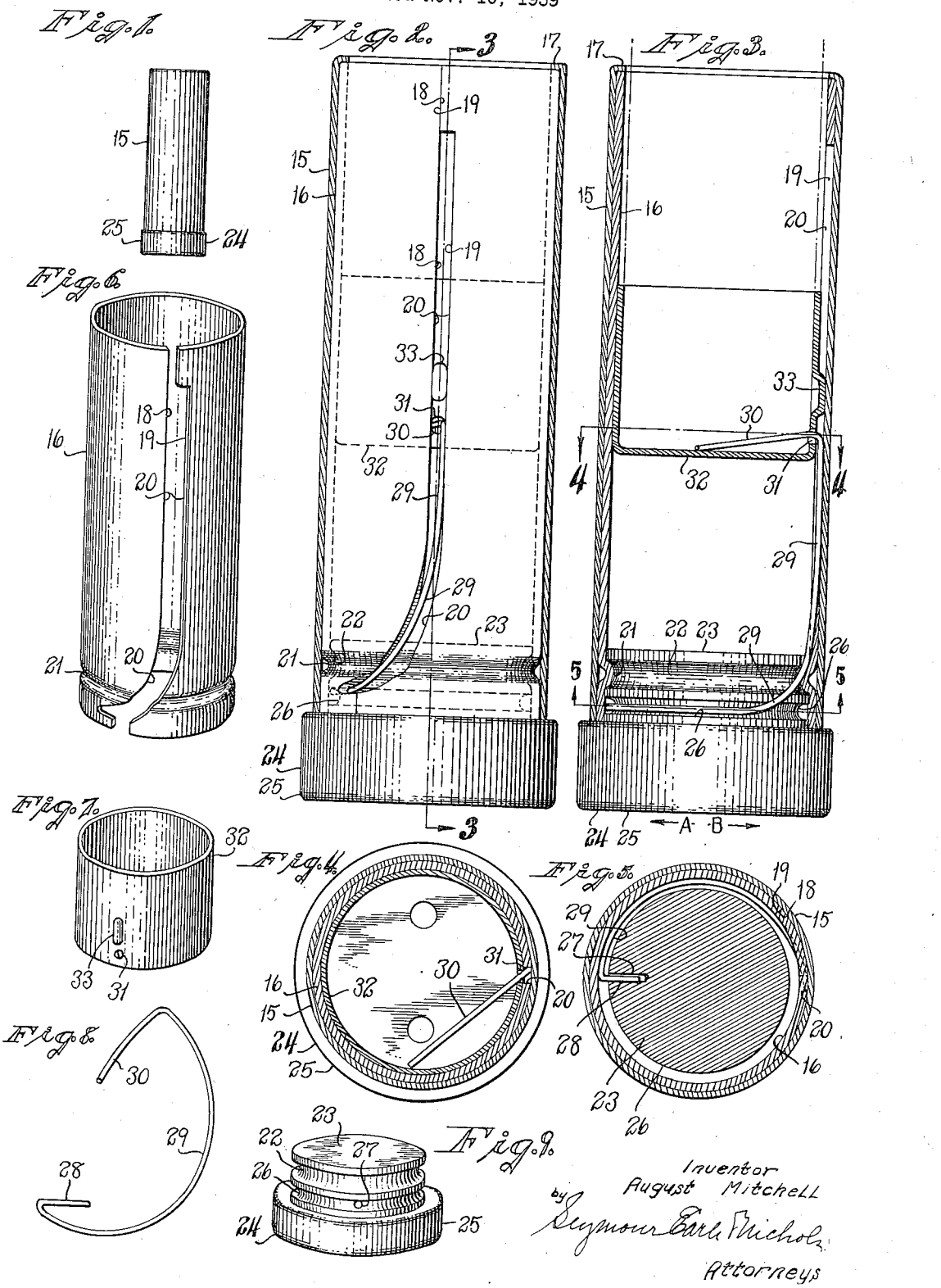

2,250,876

UNITED STATES PATENT OFFICE 2,250,876

ADJUSTABLE HOLDER FOR LIPSTICKS AND THE LIKE

August Mitchell, Middlebury, Conn., assignor to Chase Brass & Copper Co. Incorporated, Waterbury, Conn., a corporation Application November 10, 1939, Serial No. 303,719

9 Claims. (Cl. 206—56)

The present invention relates to improvements in adjustable holders for advancing material to a readily-usuable position and retiring the same from such position to a sheltered position. The adjustable holders of the present invention are especially well adapted for holding lipstick, shaving soap, etc.

One of the objects of the present invention is to provide a superior adjustable holder for lipsticks and the like, which may be produced at a low cost for manufacture and which is reliable in operation.

Another object of the present invention is to provide a superior holder for lipsticks and the like which is smooth acting in the movement of its carrier-member.

With the above and other objects in view, as will appear to those skilled in the art from the present disclosure, this invention includes all features in the said disclosure which are novel over the prior art and which are not claimed in any separate application.

In the accompanying drawing, in which certain modes of carrying out the present invention are shown for illustrative purposes:

Fig. 1 is a view in side elevation of an adjustable holder for lipsticks and the like, embodying the present invention;

Fig. 2 is a view thereof with the outer shell in central-longitudinal section;

Fig. 3 is a view in central-longitudinal section taken on the line 3—3 of Fig. 2;

Fig. 4 is a transverse sectional view taken on the line 4—4 of Fig. 3;

Fig. 5 is a similar view taken on the line 5—5 of Fig. 3;

Fig. 6 is a perspective view of the inner shell detached;

Fig. 7 is a similar view of the carrier detached;

Fig. 8 is a perspective view of the flexible operating-member; and

Fig. 9 is a perspective view of the operating-head.

The particular adjustable holder for lipsticks and the like herein chosen for the purpose of illustrating the present invention includes an outer shell 15 of tubular form and an inner shell 16 also of tubular form. The outer shell 15 is preferably formed of seamless tubing to present an attractive exterior appearance and is provided at its upper end with an inturned annular limiting-flange 17, against the inner face of which the upper edge of the inner shell 16 abuts.

The inner shell 16 above referred to, fits within the outer shell 15 with a snug friction fit, so that the two shells 15 and 16 when assembled form in effect a single unit which may be aptly termed a body. The inner shell 16 may be conveniently rolled from sheet metal into tubular form, and is formed between its opposed edges 18 and 19 with a J-shaped slot 20, the respective opposite ends of which terminate closely adjacent the upper and lower ends respectively of both the outer shell 15 and the inner shell 16. Preferably, prior to its introduction into the outer shell 15, the inner shell 16 is expanded by its own inherent resilience (Fig. 6) so as to require that it be crowded into the outer shell 15 to provide a snug frictional grip upon the interior surface thereof.

Adjacent its lower end, the inner shell 16 is formed with an inwardly-extending annular coupling-projection 21 which is adapted to snugly fit within an annular coupling-groove 22 formed adjacent the upper end of the stem or wind-portion 23 of an operating-member generally designated by the reference character 24. The said operating-member also includes an operating-head 25 and may be conveniently formed of a thermo-plastic synthetic material.

Immediately above its operating-head 25 and immediately below the coupling-groove 22 the stem 23 of the operating-head 24 is formed with an annular transmitting-member-receiving groove 26 which is intersected by the outer end of a substantially-radial socket 27, as is shown especially well in Figs. 5 and 9.

The said socket 27 receives a coupling-finger 28 formed at the lower end of a flexible transmitting-member 29. The said transmitting-member is preferably formed of a short length of spring-steel wire and is formed at its upper end with an integral coupling-finger 30 which is adapted to extend inwardly through an aperture 31 formed in the side wall of a cup-shaped carrier 32 mounted within the inner shell 16 with capacity for free vertical movement therein. The cup-shaped carrier 32 may be conveniently drawn up from thin-sheet metal and is formed in its side wall with an outwardly-projecting guide-lug 33 which enterse the J-shaped slot 20 formed between the respective opposed terminal-edges 18 and 19 of the inner shell-member 16. The said guide-lug 33 serves to hold the carrier 32 against free turning movement with respect to the inner shell 16 and hence also with respect to the outer shell 15.

The coupling-finger 30 of the flexible transmitting-member 29, as above noted, serves to operatively couple the upper end of the said transmitting member to the carrier 32, and the body-portion of the said transmitting-member extends downwardly from a point adjacent the bottom of the said carrier through the J-shaped slot 20 in the inner shell 16. The body-portion of the transmitting-member then extends inwardly from the lower end of the J-shaped slot into the groove 26 in the periphery of the stem or wind-portion 23 of the operating-member 24. As before explained, the coupling-finger 28 formed integrally at the lower end of the transmitting-member 29 enters into the socket 27 intersecting the said groove 26.

From the foregoing, it will be seen that the opposite ends of the flexible transmitting-member 29 are respectively operatively connected to the carrier 32 and the operating-member 24. Preferably, also, the body-portion of the transmitting-member 29 is pre-set or sprung so as to hug the inner surface of that portion of the outer shell 15 which forms the outer wall of the slot 20.

The outer shell 15 and the inner shell 16, while made separately, for purposes of convenience of manufacture from wrought metal, may be viewed after assembly as a unitary structure or body having a guide-groove, such as 20, in its inner periphery.

In the case of the particular structure shown, when the operating-member 24 is turned in the direction of the arrow A of Fig. 3 with respect to the inner shell 16 and the outer shell 15 and associated parts, the lower portion of the flexible transmitting-member 29 will be "wound," so to speak, in the groove 26 of the said operating-member, with the result that the portion of the transmitting-member extending upwardly through the J-shaped slot 20 will be pulled downwardly to similarly pull the carrier 32 downwardly.

On the other hand, when the operating-member 24 is rotated in the direction of the arrow B of Fig. 3 relative to the inner shell 16 and outer shell 15, the portion of the transmitting-member wound in the groove 26 will be forced upwardly through the J-shaped slot 20, with the effect of raising the carrier 32 and any lipstick or other material carried thereby, so as to project such lipstick or the like upwardly through the open end of the structure in position for convenient use.

It may be noted that the annular coupling-projection 21 extending inwardly from the inner shell 16 adjacent the lower end thereof fits into the annular coupling-groove 22 of the operating-member 24 with sufficient freedom to permit the free turning movement of the said operating-member. Despite this freedom for turning movement, the operating-member 24 is firmly held against axial displacement with respect to the inner shell 16 and associated parts when once the said inner shell has been inserted into the outer shell 15.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A holder for lipsticks and the like including in combination: a body; a carrier advanceable and retirable within the said body; a rotary operating-member associated with the said body for rotation about an axis substantially parallel with respect to the path of movement of the said carrier and having a wind-portion upon which a flexible transmitting-member may be wound; and a flexible transmitting-member having one portion extending in a direction substantially parallel to the path of movement of the said carrier and operatively connected thereto for both pulling and thrusting thereupon, the said transmitting-member also having another portion extending substantially transversely to the path of movement of the said carrier into position to be wound upon and unwound from the wind-portion of the said rotary operating-member to positively advance and retire the said carrier within the said body.

2. A holder for lipsticks and the like including in combination: a tubular body open at both ends; a carrier advanceable and retirable within the said tubular body; a rotary operating-member associated with the said tubular body for rotation about an axis substantially parallel with respect to the path of movement of the said carrier and closing one end of the said body, the said rotary operating-member having a wind-portion within the said body-member and upon which a flexible transmitting-member may be wound; and a flexible transmitting-member having one portion extending in a direction substantially parallel to the path of movement of the said carrier and operatively connected thereto for both pulling and thrusting thereupon, the said transmitting-member also having another portion extending substantially transversely to the path of movement of the said carrier into position to be wound upon and unwound from the wind-portion of the said rotary operating-member to positively advance and retire the said carrier within the said body.

3. A holder for lipsticks and the like including in combination: a body provided with a guide-way for guiding a flexible transmitting-member; a carrier advanceable and retirable within the said body; a rotary operating-member associated with the said body for rotation about an axis substantially parallel with respect to the path of movement of the said carrier and having a wind-portion upon which a flexible transmitting-member may be wound; and a flexible transmitting-member extending in the guide-way of the said body and having one portion extending in a direction substantially parallel to the path of movement of the said carrier and operatively connected thereto for both pulling and thrusting thereupon, the said transmitting-member also having another portion extending substantially transversely to the path of movement of the said carrier into position to be wound upon and unwound from the wind-portion of the said rotary operating-member to positively advance and retire the said carrier within the said body.

4. A holder for lipsticks and the like including in combination: a body provided with a substantially J-shaped guide-way for the guidance of a flexible transmitting-member; a carrier advanceable and retirable within the said body; a rotary operating-member rotatably associated with the said body and having a wind-portion registering with a portion of the J-shaped guide-way therein and upon which wind-portion a flexible transmitting-member may be wound; and a flexible transmitting-member extending in the J-shaped guide-way in the said body and operatively connected to both the said carrier and the said rotary operating-member and passing from the J-shaped guide-way of the said body into position to be wound upon and unwound from the wind-portion of the said rotary operating-member to advance and retire the said carrier within the said body.

5. A holder for lipsticks and the like including in combination: a tubular body having an inwardly-facing guide-way for the guidance of a flexible transmitting-member; a carrier advanceable and retirable within the said tubular body; a rotary operating-member associated with the said tubular body for rotation about an axis substantially parallel with respect to the path of movement of the said carrier and closing one end of the said body, the said rotary operating-member having a wind-portion extended within the interior of the said tubular body in registration with the guide-way therein and into position to receive a portion of a flexible transmitting-member; and a flexible transmitting-member extending in the guide-way of the said tubular body and having one portion extending in a direction substantially parallel to the path of movement of the said carrier and operatively connected thereto for both pulling and thrusting thereupon, the said transmitting-member also having another portion extending substantially transversely to the path of movement of the said carrier into position to be wound upon and unwound from the wind-portion of the said rotary operating-member to positively advance and retire the said carrier within the said body.

6. A holder for lipsticks and the like including in combination: a tubular body having a substantially J-shaped inwardly-facing guide-way for the reception and guidance of a flexible transmitting-member; a carrier advanceable and retirable within the said tubular body; a rotary operating-member attached to the said tubular body with capacity for rotating movement with respect thereto and closing one end thereof, the said rotary operating-member having a wind-portion extending within the interior of the said tubular body in registration with a portion of the substantially J-shaped guide-way therein and into position to receive a portion of a flexible transmitting-member; and a flexible transmitting-member extending in the substantially J-shaped guide-way of the said tubular body and operatively connected to both the said carrier and the said rotary operating-member and extending into position to be wound upon and unwound from the wind-portion of the said rotary operating-member to advance and retire the said carrier within the said tubular body.

7. A holder for lipstick and the like including in combination: an outer shell; a tubular inner shell within the said outer shell in coupled relationship thereto and provided with a substantially-longitudinal guide-way for the guidance of a flexible transmitting-member; a carrier advanceable and retirable within the said inner shell; a rotary operating-member rotatably associated with the said inner shell and having a wind-portion upon which a flexible transmitting-member may be wound; and a flexible transmitting-member operatively connected to both the said carrier and the said rotary operating-member and extending into position to be wound upon and unwound from the wind-portion of the said rotary operating-member to advance and retire the said carrier within the said inner shell.

8. A holder for lipsticks and the like including in combination: an outer shell; a split tubular inner shell within the said outer shell in coupled relationship thereto and provided with a substantially-longitudinal guide-way for the guidance of a flexible transmitting-member; a carrier advanceable and retirable within the said split inner shell; a rotary operating-member rotatably associated with the said split inner shell and having a wind-portion upon which a flexible transmitting-member may be wound; and a flexible transmitting-member located in the guide-way of the said split inner shell and operatively connected to both the said carrier and the said rotary operating-member and extending into position to be wound upon and unwound from the wind-portion of the said rotary operating-member to advance and retire the said carrier within the said split inner shell.

9. A holder for lipsticks and the like including in combination: a tubular outer shell; a tubular inner shell located within the said tubular outer shell and coupled thereto and substantially-longitudinally split and shaped to provide a guide-slot between its opposed edges for the reception and guidance of a flexible transmitting-member; a carrier advanceable and retirable within the said inner shell; a rotary operating-member having a stem extending within the interior of the said tubular inner shell, the said stem being connected to the said inner shell with capacity for rotation with respect thereto and interlocked therewith against axial displacement; and a flexible transmitting-member operatively connected to both the said carrier and the stem of the said rotary operating-member and extending through the substantially J-shaped guide-slot provided between the opposed edges of the said split inner shell, the said flexible transmitting-member extending inwardly into position to be wound upon and unwound from the stem of the said rotary operating-member to advance and retire the said carrier within the said inner shell.

AUGUST MITCHELL.